(12) United States Patent
Viswanathan et al.

(10) Patent No.: US 11,995,140 B2
(45) Date of Patent: May 28, 2024

(54) PATTERN DETECTION FOR TENANT-SPECIFIC PERFORMANCE DATA

(71) Applicant: Salesforce, inc., San Francisco, CA (US)

(72) Inventors: Vivek Viswanathan, Clovis, CA (US); Amol Suresh Hardikar, Greenbrae, CA (US); Karishma Kishore Lalwani, Woodland Hills, CA (US); Alok K Patel, Fremont, CA (US); Jackson Zee Herrick, San Francisco, CA (US); Paymon Teyer, San Ramon, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 17/821,429

(22) Filed: Aug. 22, 2022

(65) Prior Publication Data
US 2023/0092948 A1 Mar. 23, 2023

Related U.S. Application Data

(60) Provisional application No. 63/261,411, filed on Sep. 20, 2021.

(51) Int. Cl.
*G06F 16/9538* (2019.01)
*G06F 11/07* (2006.01)
(Continued)

(52) U.S. Cl.
CPC ........ *G06F 16/9538* (2019.01); *G06F 11/079* (2013.01); *G06F 11/323* (2013.01); *G06F 11/3409* (2013.01); *G06Q 10/10* (2013.01); *G06F 2201/80* (2013.01); *G06F 2201/835* (2013.01)

(58) Field of Classification Search
CPC .. G06F 11/079; G06F 11/323; G06F 11/3409; G06F 16/9538; G06F 2201/80; G06F 2201/835; G06Q 10/10
See application file for complete search history.

(56) References Cited

U.S. PATENT DOCUMENTS 6,587,847 B1 * 7/2003 Stier ............... G06Q 10/10
706/50
6,604,131 B1 * 8/2003 Warris ............. G06Q 10/10
709/224

(Continued)

*Primary Examiner* — Etienne P Leroux
(74) *Attorney, Agent, or Firm* — Holland & Hart LLP

(57) ABSTRACT

Methods, systems, apparatuses, and computer program products are described. A database system may store data logs tracking performance data for multiple tenants of the database system. The database system may receive, via a user interface of a user device, a user input indicating a request to perform an analysis of performance data associated with one of the multiple tenants. The request may indicate a time period and a performance metric for the analysis. The database system may execute a query based on the analysis. The query may execute on a subset of the data logs associated with the tenant and the performance metric. The system may analyze a result of the query to determine one or more entities that affected the performance metric during the time period. The system may transmit an indication of the one or more entities for display at the user interface.

20 Claims, 12 Drawing Sheets

(51) Int. Cl.
    *G06F 11/32*     (2006.01)
    *G06F 11/34*     (2006.01)
    *G06Q 10/10*     (2023.01)

(56) References Cited

U.S. PATENT DOCUMENTS

| | | | | |
|---|---|---|---|---|
| 2005/0240467 | A1* | 10/2005 | Eckart | G06Q 40/12 |
| | | | | 705/30 |
| 2014/0025442 | A1* | 1/2014 | Goodson | G06Q 10/06 |
| | | | | 705/7.39 |
| 2015/0127670 | A1* | 5/2015 | Torman | G06Q 30/0201 |
| | | | | 707/755 |
| 2017/0348563 | A1* | 12/2017 | Kim | A63B 24/0087 |
| 2021/0089532 | A1* | 3/2021 | Patel | G06F 16/24542 |
| 2022/0342923 | A1* | 10/2022 | Counts | G06F 16/9537 |

* cited by examiner

PATTERN DETECTION FOR TENANT-SPECIFIC PERFORMANCE DATA

CROSS REFERENCES

The present application for Patent claims priority to U.S. Provisional Application No. 63/261,411 by Viswanathan et al., entitled "DETECTING PATTERNS AT SCALE FOR TENANT-SPECIFIC PERFORMANCE DATA," filed Sep. 20, 2021, which is assigned to the assignee hereof and expressly incorporated herein by reference in its entirety.

FIELD OF TECHNOLOGY

The present disclosure relates generally to database systems and data processing, and more specifically to pattern detection for tenant-specific performance data.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some data processing systems that support customizable platforms, organizations can implement CRM solutions in multiple ways, leveraging different capabilities of these platforms to accomplish specific tasks. Sometimes these CRM solutions may not scale effectively under load, which may result in a variety of errors or performance inefficiencies.

DETAILED DESCRIPTION

Figure 1:
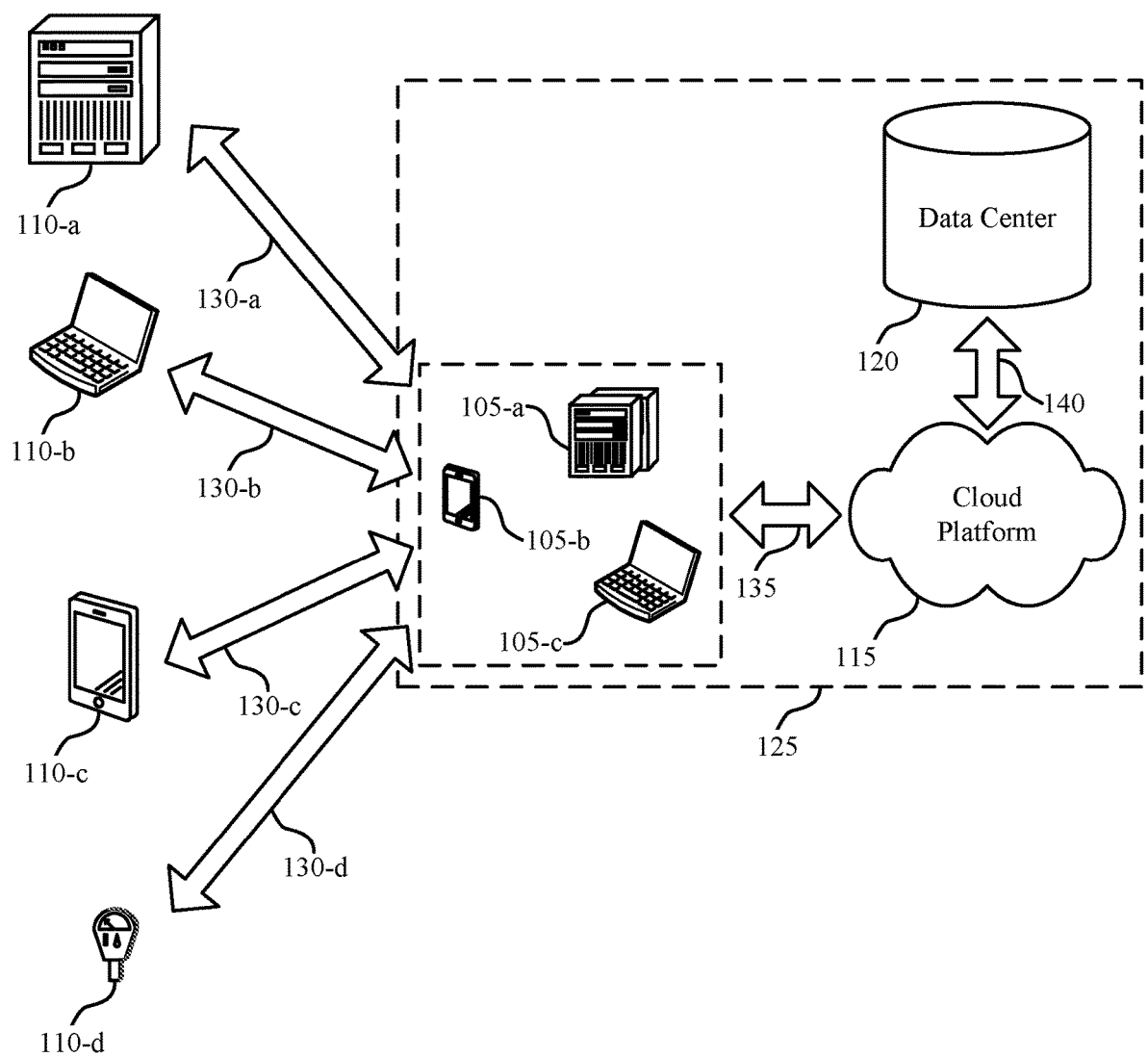
FIGS. 1 and 2 illustrate examples of systems that support pattern detection for tenant-specific performance data in accordance with aspects of the present disclosure.

In some data processing systems that support customizable platforms, customers can implement customer relationship management (CRM) solutions in multiple ways, leveraging different capabilities of these platforms to accomplish specific tasks. Sometimes these CRM solutions may not scale effectively under load, which may result in a variety of errors or performance inefficiencies elsewhere. The techniques described herein may provide for a system that can analyze performance and error data and determine inefficiencies related to design, architecture, or implementation for a specific tenant of a multi-tenant database system (a database system that supports multiple tenants). Such analysis may enable the tenants to improve the efficiency and scalability of CRM solutions (e.g., tenant-specific solutions).

In accordance with aspects of the present disclosure, a database system may store one or more data logs that include performance data associated with multiple tenants (e.g., organizations, clients, customers) of the database system. The database system may receive, via a user interface of a user device, a user input indicating a selection of an analysis (also referred to as an investigation) of performance data associated with a tenant of the database system. The user input may be received from a user associated with the tenant. In some examples, the user input may indicate a time period and a performance metric for the analysis.

The database system may execute (trigger) a query based on the user input. The query may execute on a subset of the one or more data logs associated with the tenant, the performance metric, the time period, or a combination thereof. Accordingly, the database system may analyze a result of the query to determine one or more entities (e.g., code segments, user identifiers, user actions, data objects) that have affected or otherwise contributed to the performance metric during the time period. The database system may transmit, for display at the user interface of the user device, an indication of the one or more entities (equivalently referred to as contributors) that have affected the performance metric within the time period.

The techniques described herein may enable users associated with the tenant to implement CRM solutions with greater efficiency and fewer errors, among other benefits. For example, aspects of the present disclosure may support techniques for analyzing tenant-specific performance metrics, errors, and execution metrics in a distributed system, techniques for detecting data trends (e.g., patterns or anti-patterns) at scale, techniques for identifying performance bottlenecks, and techniques for providing corrective actions based on identified scale issues and related contributors.

Aspects of the disclosure are illustrated by and described with reference to systems, user interfaces and process flows. Aspects of the disclosure are further illustrated by and described with reference to apparatus diagrams, system diagrams, and flowcharts that relate to detecting patterns at scale for tenant-specific performance data.

FIG. 1 illustrates an example of a system 100 for cloud computing that supports pattern detection for tenant-specific performance data in accordance with various aspects of the present disclosure. The system 100 includes cloud clients 105, contacts 110, cloud platform 115, and data center 120.

Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some data processing systems that support customizable platforms, customers can implement CRM solutions in multiple ways, leveraging different capabilities of these platforms to accomplish specific tasks. Sometimes these CRM solutions may not scale effectively under load, which may result in a variety of errors or performance inefficiencies elsewhere. The techniques described herein may provide for a system that can analyze performance and error data and determine inefficiencies related to design, architecture, or implementation. This analysis may enable the tenants of a multi-tenant database system (e.g., the data center 120, the cloud platform 115, or some combination thereof) to improve the efficiency and scalability of CRM solutions, among other solutions.

In accordance with aspects of the present disclosure, a database system may store one or more data logs that include performance data associated with multiple tenants of the database system. The database system may receive, via a user interface of a user device (e.g., a cloud client 105), a user input indicating a request to perform an analysis (investigation) of performance data associated with a tenant of the database system. The user input may be received from a user associated with the tenant, and may indicate a time period and a performance metric for the analysis. The database system may trigger (execute) a query based on the user input. The query may execute on a subset of the one or more data logs associated with the tenant and the performance metric. The database system may analyze a result of the query to determine one or more entities (contributors) that have adversely affected the performance metric during the time period. The database system may transmit (send), for display at the user interface of the user device, an indication of the one or more entities that have contributed to (negatively affected) the performance metric.

The techniques described with reference to FIG. 1 may enable users associated with the tenant to implement CRM solutions with greater efficiency and fewer errors, among other benefits. For example, aspects of the present disclosure may support techniques for analyzing tenant-specific performance metrics, errors, and execution metrics in a distributed system, techniques for detecting anti-patterns and identifying performance bottlenecks at scale, and techniques for providing or otherwise suggesting corrective actions based on identified scale issues and related contributors.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes, as described herein. However, the description and appended drawings only include example technical improvements resulting from implementing aspects of the disclosure, and accordingly do not represent all of the technical improvements provided within the scope of the claims.

Figure 2:
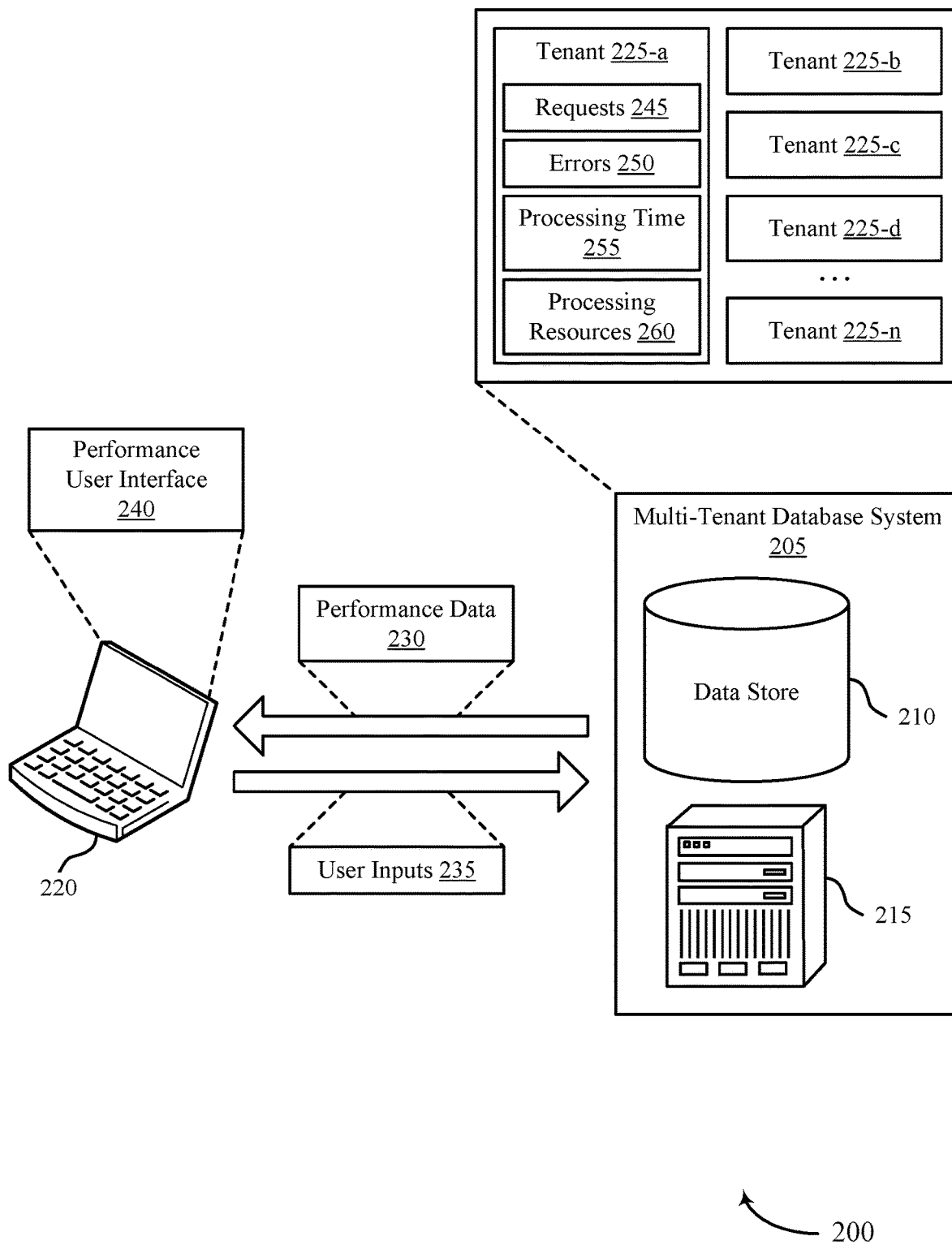

FIG. 2 illustrates an example of a system 200 that supports pattern detection for tenant-specific performance data in accordance with aspects of the present disclosure. The system 200 may be an example of a system 100 or a subsystem 125, as described with reference to FIG. 1. The system 200 may include a multi-tenant database system 205 that may store and process data for multiple tenants 225. Data for different tenants 225 may be stored separately, such that users associated with one tenant 225 may be restricted from accessing data associated with a different tenant 225. A user, operating a user device 220, may send requests to the multi-tenant database system 205 to view data records, create data records, modify data records, aggregate or analyze data, or any combination thereof.

To access data in the multi-tenant database system 205, a user may have a user identifier (ID) associated with a specific tenant 225 (e.g., linked to a specific tenant ID). Additionally or alternatively, the user ID may be associated with a specific access level defining the operations that the multi-tenant database system 205 supports for the user (e.g., what data may be viewed or modified by that level of user or that specific user). The multi-tenant database system 205 may include one or more data stores 210 for storing data, one or more processing devices 215 (e.g., a database server, application server, worker server, server cluster, cloud-based resources, virtual machine, container, or any combination of these or other devices capable of processing data), or both. The multi-tenant database system 205 may be an example of a cloud platform 115, a data center 120, or a combination thereof, and the user device 220 may be an example of a cloud client 105, as described with reference to FIG. 1. The multi-tenant database system 205 may support analyzing performance data 230 for a tenant 225 at scale.

The multi-tenant database system 205 may securely store data for multiple separate tenants 225, such as a tenant 225-a, a tenant 225-b, a tenant 225-c, a tenant 225-d, up to a tenant 225-n. It is to be understood that the multi-tenant database system 205 may support any quantity of tenants 225. The multi-tenant database system 205 may store tenant-specific performance data, for example, in a set of data logs. The logs may be structured according to a database schema that supports efficient creation of logs (e.g., in response to any activities performed for a tenant 225), efficient querying of the logs (e.g., across thousands or millions of rows in the logs), or both. The data log for a tenant 225 may track performance data 230 specific to that tenant 225. As an example, the multi-tenant database system 205 may store requests 245, errors 250, processing times 255, processing resources 260, or any combination of these or other performance parameters in the data log for the tenant 225-a.

If a user of the tenant 225-a accesses the multi-tenant database system 205 (e.g., logs into the system, sends a request to the system), the multi-tenant database system 205 may capture one or more aspects of the activity in a log entry (e.g., a row of the log, with the columns of the log corresponding to specific values associated with the activity). Additionally or alternatively, the multi-tenant database system 205 may capture information associated with integrations to the multi-tenant database system 205. For example, if an integration between the multi-tenant database system 205 and a third-party service communicates data (e.g., into the multi-tenant database system 205 or out of the multi-tenant database system 205), the multi-tenant database system 205 may capture one or more aspects of the integration activity in a log for the corresponding tenant 225.

The multi-tenant database system 205 may collect, organize, and analyze the performance metrics for a tenant 225 and present one or more results of the analysis to users of the tenant 225. For example, a user associated with the tenant 225-a and operating a user device 220 may receive performance data 230 for the tenant 225-a. One or more processing devices 215 may analyze the set of data logs on the backend to determine the performance data 230 for display in a user interface (e.g., a performance user interface 240) at the user device 220. The multi-tenant database system 205 may analyze the performance metrics for a tenant 225 such that the underlying data is secure according to one or more security policies. For example, running the performance analysis may refrain from (e.g., restrict) accessing any personal identifiable information (PII) stored for a tenant 225. Additionally or alternatively, the performance analysis may obfuscate specific underlying metrics and surface aggregate performance data 230 that does not allow a user to determine the underlying metrics contributing to the aggregate performance data if the user is restricted from viewing the specific underlying metrics (e.g., metrics associated with one or more specific users, metrics associated with one or more specific clients).

The performance data 230 may be both tenant-specific and tenant-wide. For example, the performance data 230 for the tenant 225-a may not depend on—or risk surfacing-any data from other tenants 225 of the multi-tenant database system 205. Additionally, the performance data 230 may be generated from a complete set of data for the tenant 225-a (e.g., across multiple or all users of the tenant 225-a, across multiple or all data objects of the tenant 225-a, across multiple or all processing resources of the tenant 225-a). As such, the multi-tenant database system 205 may generate and analyze the performance data 230 at scale (e.g., running queries on massive amounts of data logs, such as thousands or millions of log entries). For example, the multi-tenant database system 205 may leverage one or more services that support queries on massive sets of data (e.g., above a threshold data size), such as Splunk queries.

The multi-tenant database system 205 may additionally include one or more safeguards to stop inefficient processing, such as a threshold quantity of queries that may be performed concurrently, a time-out value for stopping processes that take longer than a threshold time or more than a threshold amount of computing resources, or any other safeguards. In some cases, the multi-tenant database system 205 may periodically, aperiodically, or continuously run performance analysis procedures on the logs on the backend, updating the logs used based on new activities captured in the set of data logs (e.g., in real time or pseudo-real time based on runtime data, design-time data, or both). In some examples, the performance data 230 may correspond to a specific time period, a specific set of errors 250, or some other filter.

Additionally or alternatively, the processing devices 215 may determine tenant-agnostic performance data across multiple tenants 225. Such performance data 230 may support insights into pre-configured code, data objects, processes, or a combination thereof defined by the multi-tenant database system 205 for use by any tenant 225. The tenant-agnostic performance data may be viewed and analyzed by users (e.g., administrative users) associated with the multi-tenant database system 205, as opposed to users associated with any one tenant 225.

The multi-tenant database system 205 may send the performance data 230 for display by the user device 220 in a performance user interface 240. In some examples, the performance user interface 240 may present the performance data 230 on a timeline, in a pie chart, in a bar graph, or in any other display configuration. The performance user interface 240 may allow a user of the user device 220 to view the performance data 230 and dig into specific aspects of the performance data 230. For example, the user may use one or more user inputs 235 to the performance user interface 240 to view specific performance data 230, analyze specific performance data 230, or perform other operations associated with performance analysis at scale for a tenant 225.

In the example of FIG. 2, the multi-tenant database system 205 may store a set of data logs tracking performance data 230 for multiple tenants 225 of the multi-tenant database system 205. The multi-tenant database system 205 may receive, via a user interface (e.g., the performance user interface 240) of a user device 220, user inputs 235 indicating a selection of an investigation for performance data 230 of a tenant (e.g., the tenant 225-*a*) of the multiple tenants 225. The user inputs 235 may correspond to a user associated with the tenant (e.g., the tenant 225-*a*), and the investigation may indicate a time period and a performance metric for data analysis. The multi-tenant database system 205 may trigger a query based on the investigation. The query may execute on a subset of the set of data logs associated with the tenant and the performance metric.

Accordingly, the multi-tenant database system 205 may analyze a query result of the query to determine one or more contributors (also referred to as entities) that have adversely affected the performance metric during the time period. The multi-tenant database system 205 may send, for display at the user interface (e.g., the performance user interface 240) of the user device 220, an indication of the one or more contributors negatively affecting the performance metric based on the analyzing. The techniques described herein may enable users associated with a tenant 225 to implement CRM solutions with greater efficiency and fewer errors, among other benefits.

Figure 3:
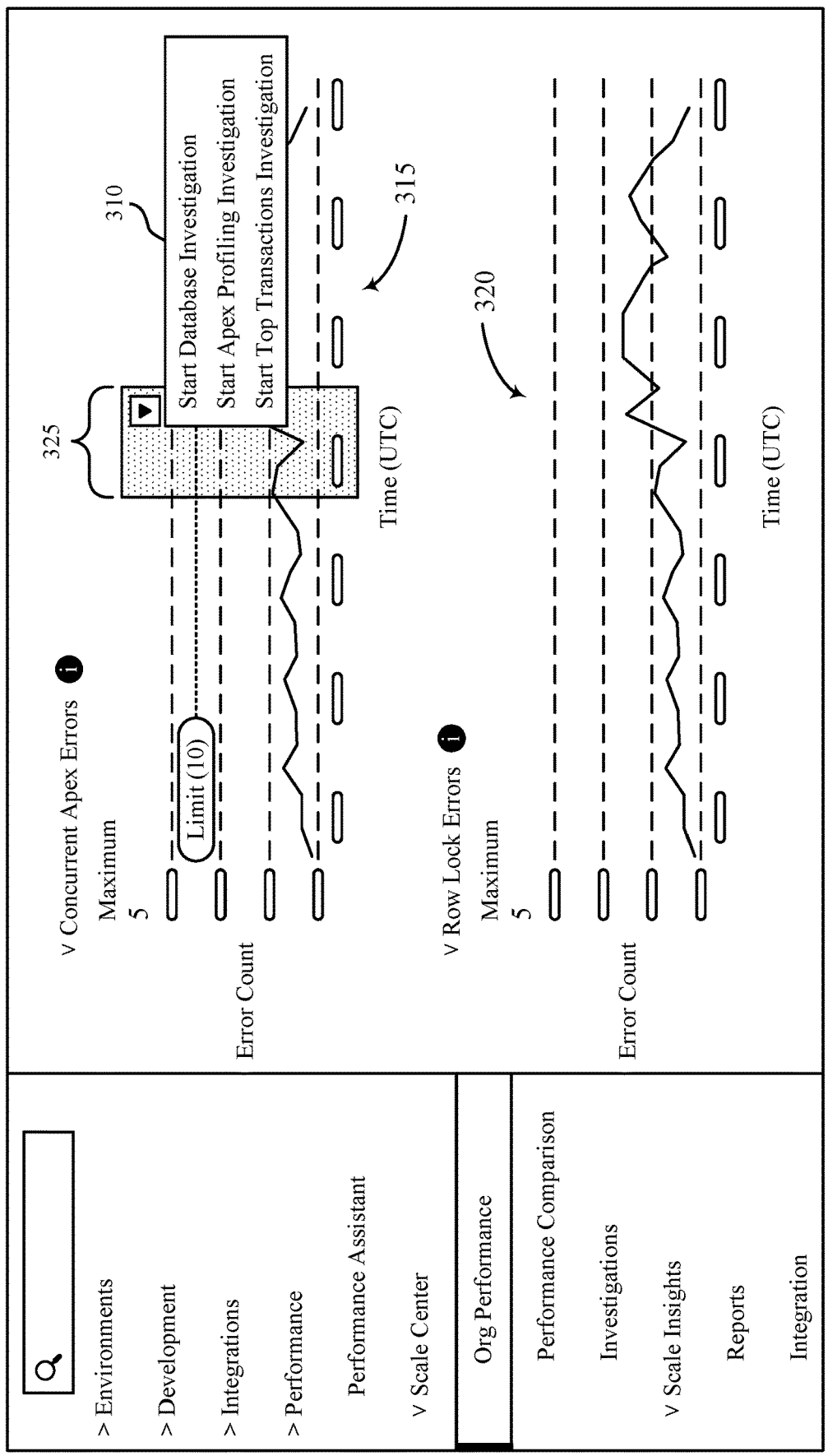
FIGS. 3 and 4 illustrate examples of user interfaces that support pattern detection for tenant-specific performance data in accordance with aspects of the present disclosure.

FIG. 3 illustrates an example of a user interface 300 that supports pattern detection for tenant-specific performance data in accordance with aspects of the present disclosure. The user interface 300 may implement or be implemented by aspects of the system 100 or the system 200. For example, the user interface 300 may display information associated with a multi-tenant database system 205, as described with reference to FIG. 2. The user interface 300 may illustrate an example of a tenant-specific self-service interface that enables a user to further research a performance issue. The user interface 300 may include a drop-down menu 310 that enables a user to select or otherwise initiate an investigation of performance data associated with a tenant of a multi-tenant database system.

As described herein, an investigation may refer to the process of identifying trends (also referred to as patterns or anti-patterns) in tenant-specific performance data and determining which entities (users, data records, actions, tenants) have contributed to these trends. For example, a service supported or otherwise provided by a multi-tenant database system (e.g., the multi-tenant database system 205 described with reference to FIG. 2) may identify one or more data records or user identifiers (e.g., contributors) that are responsible for a row lock error that occurred in the multi-tenant database system. After completing the investigation (equivalently referred to as an analysis), the multi-tenant database system may present relevant information (detected trends, relevant contributors) to a user that requested or otherwise selected the investigation.

In some data processing systems that support customizable platforms, customers can implement CRM solutions in multiple ways, leveraging different capabilities of these platforms to accomplish specific tasks. Sometimes these CRM solutions may not scale effectively under load, which may result in a variety of errors or performance inefficiencies. The techniques described herein may provide for a system that can analyze performance and error data and determine inefficiencies related to design, architecture, or implementation. Such analysis may enable a tenant (e.g., one or more users associated with the tenant) to improve the efficiency and scalability of CRM solutions specific to that tenant.

Aspects of the present disclosure may support anti-pattern (e.g., an undesired or otherwise inefficient pattern of performance metrics) detection and delivery of corrective actions for detected anti-patterns. As described herein, an anti-pattern may refer to a practice or implementation that results in lower data processing efficiency, increased errors, and decreased performance. To support the techniques described herein, an aggregator service may collate (e.g., aggregate) telemetry data, execution times, system-load data, and other performance metrics associated with tenant systems from underlying monitoring and logging systems. In addition, an analytics component may inspect the data and provide insights as well as remediation recommendations for issues or errors encountered. These remediation recommendations may include suggested actions curated from previous solutions used to successfully resolve such issues.

The self-service tenant-specific interface illustrated in the example of FIG. 3 may include a user interface that presents information to a user (e.g., in the form of tables, charts and graphs 320) to summarize performance-related data for a chosen time-period. In some cases, a user may select a time period 325 of interest by highlighting a portion of a timeline 315. Information such as processes taking the longest time to execute, breakdown of execution times, errors encountered, or concurrent requests, may be presented to a user via the self-service tenant-specific interface. The self-service tenant-specific interface may also include a deep-dive component that provides the capability to surface additional metrics and debugging information for a targeted time period of interest. These additional metrics may identify low-level details such as actual method names, object identifiers, or other information that can be used for manual troubleshooting. In addition, the self-service tenant-specific interface may include a comparison component that enables users to perform a side-by-side comparison of performance data against a snapshot corresponding to a prior time period. This side-by-side comparison may be used to identify trends or differences in the performance data.

The user interface 300 may provide visibility to server-side scale metrics and may enable troubleshooting and resolution of scale issues in a self-service manner. The user interface 300 may also support techniques for surfacing (e.g., displaying) underlying correlations between various scale issues or errors (e.g., a database rowlock contention leading to a process concurrency issue). Additionally, the user interface 300 may provide details related to which aspects of a tenant design architecture are most likely to experience scale or performance issues.

Figure 4:

FIG. 4 illustrates an example of a user interface 400 that supports pattern detection for tenant-specific performance data in accordance with aspects of the present disclosure. The user interface 400 may implement or be implemented by aspects of the system 100 or the system 200. For example, the user interface 400 may display data associated with a multi-tenant database system 205 described with reference to FIG. 2. The user interface 400 may illustrate an example of an analysis visualization indicating a detected pattern (e.g., an anti-pattern) and various corrective actions for the detected pattern. For example, the user interface 400 may include an investigation analysis 430 that identifies one or more data records (N) or users (X) that have caused (or contributed to) a row lock error, a concurrent apex error, etc. The investigation analysis 430 may also include one or more suggested actions for remediating these errors.

As described with reference to FIGS. 1 through 3, a multi-tenant database system may store one or more data logs that include performance data 415 associated with tenants of the multi-tenant database system. The multi-tenant database system may receive (via the user interface 400) a user input indicating a request to perform an analysis of performance data 415 associated with a tenant of the multi-tenant database system. The request may indicate a time period and a performance metric for the investigation. The multi-tenant database system may execute a query in response to the request. The multi-tenant database system may execute the query by parsing a subset of the one or more data logs associated with the tenant and the performance metric.

Accordingly, the multi-tenant database system may analyze a result of the query to determine one or more entities that affected the performance metric during the time period. The multi-tenant database system may transmit an indication of the one or more contributors (e.g., charts 420 and graphs 425) for display at the user interface of the user device based on analyzing the result of the query. The multi-tenant database system may also transmit (for display at the user interface 400) an indication of details 410 related to the investigation. For example, the multi-tenant database system may display a metric type (Row Lock Errors), a timestamp associated with execution of the query (May 24, 2021 at 3:00 PM), a start time of the investigation (May 19, 2021 at 5:00 PM), an end time of the investigation (May 19, 2021 at 5:05 PM), and a completion status of the investigation (completed).

The analysis visualization illustrated in the example of FIG. 4 may include a user interface that presents information to a user (e.g., in the form of tables, charts 420, and graphs 425) to summarize performance data 415 for a selected time-period. Information such as processes taking the longest time to execute, breakdown of execution times, errors encountered, or concurrent requests may be presented to a user via the analysis visualization. The analysis visualization may also include a deep-dive component that provides the capability to surface additional metrics and debugging information for a targeted time period of interest. These additional metrics may identify low-level details such as actual method names, object identifiers, or other information that can be used for manual troubleshooting. In addition, the analysis visualization may include a comparison component that enables users to perform a side-by-side comparison of performance data against a snapshot corresponding to a prior time period. This side-by-side comparison may be used to identify trends or differences in the performance data.

The user interface 400 may provide visibility to server-side scale metrics and may also enable troubleshooting and resolution of scale issues in a self-service manner. Additionally, the user interface 400 may support techniques for surfacing (e.g., displaying) underlying correlations between various scale issues or errors (e.g., a database rowlock contention leading to a process concurrency issue). Furthermore, the user interface 400 may provide details related to which aspects of a tenant design architecture are most likely to experience scale or performance issues.

Figure 5:
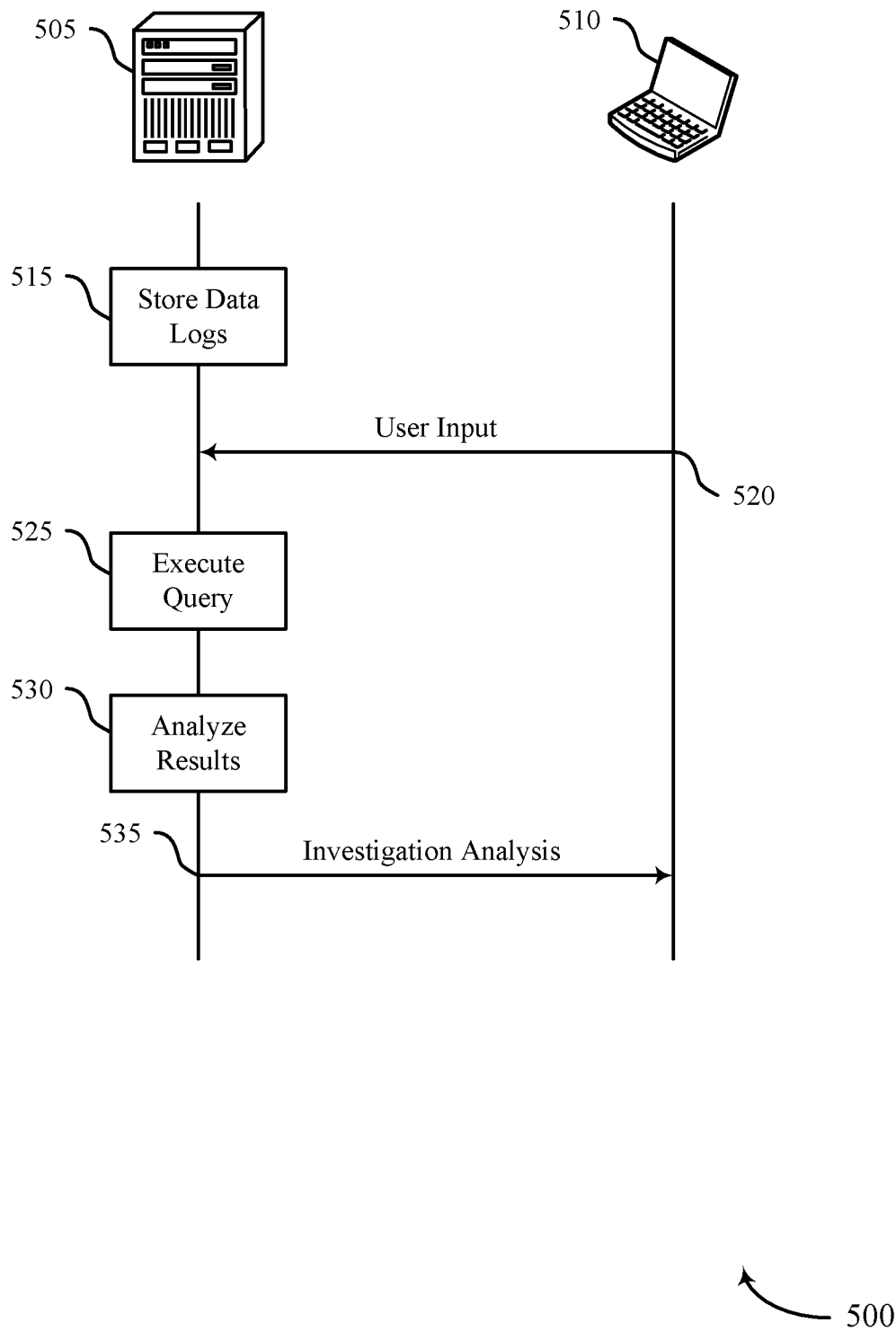
FIG. 5 illustrates an example of a process flow that supports pattern detection for tenant-specific performance data in accordance with aspects of the present disclosure.

FIG. 5 illustrates an example of a process flow 500 that supports pattern detection for tenant-specific performance data in accordance with aspects of the present disclosure. The process flow 500 may implement or be implemented by aspects of the system 100 or the system 200. For example, the process flow 500 may include a multi-tenant database system 505 and a user device 510, which may be examples of corresponding devices described with reference to FIGS. 1 and 2. In the following description of the process flow 500, operations between the multi-tenant database system 505 and the user device 510 may be added, omitted, or performed in a different order (with respect to the exemplary order shown).

At 515, the multi-tenant database system 505 may store one or more data logs that include performance data (e.g., the performance data 415 described with reference to FIG. 4) for multiple tenants of the multi-tenant database system 505. At 520, the multi-tenant database system 505 may receive, via a user interface of the user device 510, a user input indicating a selection of an investigation related to performance data associated with a tenant of the multi-tenant database system 505. The user input may be received from a user associated with the tenant. The investigation may indicate a time period and a performance metric for data analysis. The performance metric may include a processing time, a quantity of processing resources, a quantity of memory resources, an error type, etc.

In some examples, the multi-tenant database system 505 may send (transmit), for display at a user interface of the user device 510, a subset of the performance data associated with a tenant of the multi-tenant database system 505. In some examples, the user input may be received in response to displaying the subset of the performance data. Additionally or alternatively, the multi-tenant database system 505 may transmit, for display at the user interface of the user device 510, an indication of a suggested investigation for the subset of the performance data. In some examples, the user input (indicating the selection of the investigation) may be received in response to displaying the suggested investigation.

At 525, the multi-tenant database system 505 may trigger (execute) a query based on the investigation. The query may execute on a subset of the one or more data logs associated with the tenant and the performance metric. In some examples, the multi-tenant database system 505 may send instructions to a service to execute the query on the subset of the one or more data logs. The service may support query execution at scale for the tenant of the multi-tenant database system 505.

At 530, the multi-tenant database system 505 may analyze a result of the query to determine one or more contributors (equivalently referred to as entities) that have affected the performance metric during the time period. For example, the query result may indicate that a performance metric is caused (or affected by) by a user, a code segment, a process (e.g., a step in the process, an order of the process), a data object, an integration or query, or any combination of these (or other) factors associated with tenant processes performed at the multi-tenant database system 505. In some examples, the multi-tenant database system 505 may receive this information from the service (after transmitting instructions to execute the query).

At 535, the multi-tenant database system 505 may send (transmit), for display at the user interface of the user device 510, an indication of the one or more entities that have negatively affected the performance metric. For example, the multi-tenant database system 505 display a visualization (e.g., the charts 420 and graphs 425 described with reference to FIG. 4) that illustrates various information related to the one or more entities. The multi-tenant database system 505 may also display one or more suggested actions for remediating or otherwise improving the performance metric. Additionally, or alternatively, the multi-tenant database system 505 may display information related to the investigation. For example, the multi-tenant database system 505 may display a start time of the investigation, an end time of the investigation, a completion status of the investigation, etc.

Figure 6:
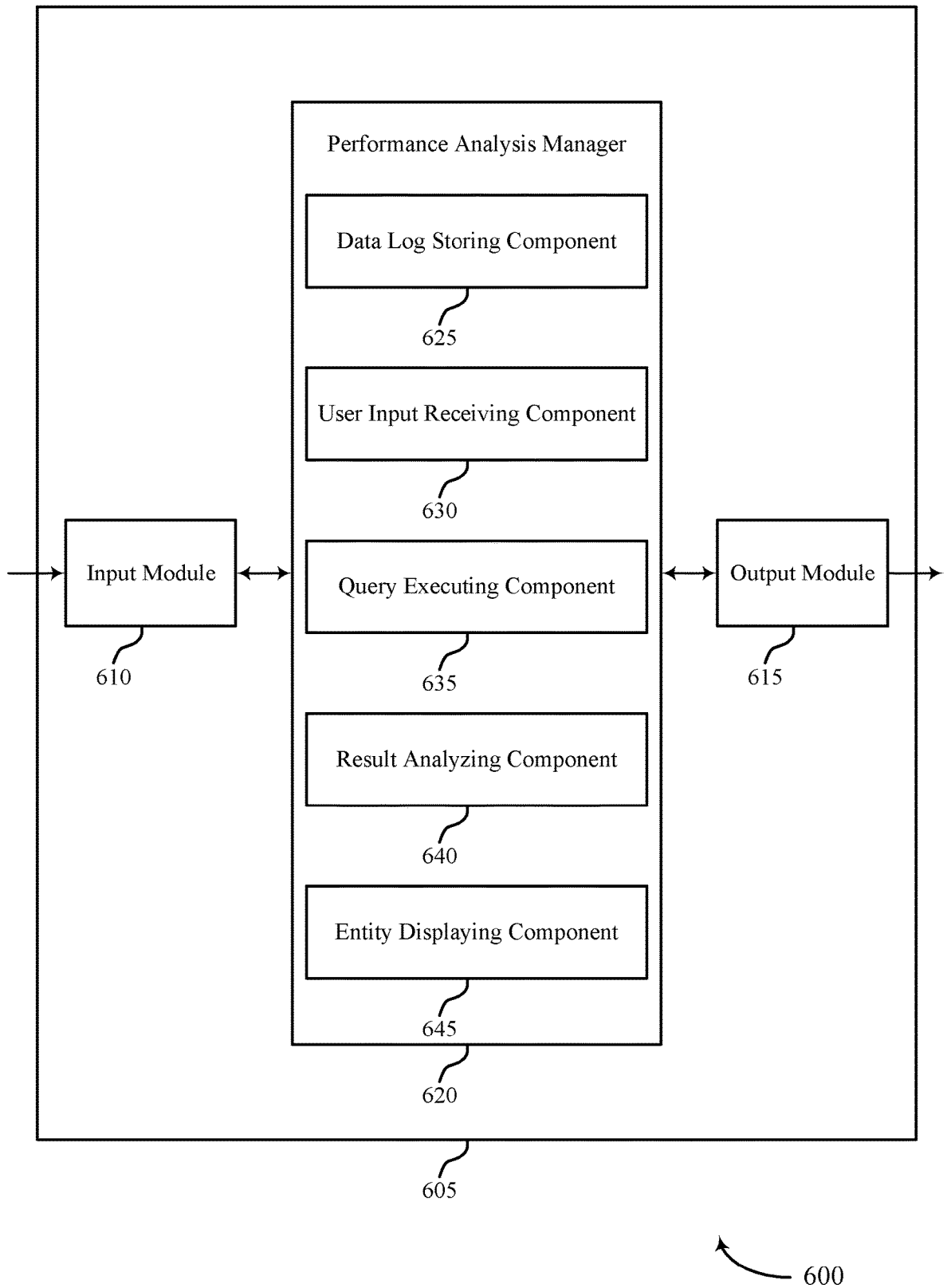
FIG. 6 shows a block diagram of an apparatus that supports pattern detection for tenant-specific performance data in accordance with aspects of the present disclosure.

FIG. 6 shows a block diagram 600 of a device 605 that supports pattern detection for tenant-specific performance data in accordance with aspects of the present disclosure. The device 605 may include an input component 610, an output component 615, and a performance analysis manager 620. The device 605 may also include a processor. Each of these components may be in communication with one another (e.g., via one or more buses).

The input component 610 may manage input signals for the device 605. For example, the input component 610 may identify input signals based on an interaction with a modem, a keyboard, a mouse, a touchscreen, or a similar device. These input signals may be associated with user input or processing at other components or devices. In some cases, the input component 610 may utilize an operating system such as iOS®, ANDROID®, MS-DOS®, MS-PERIODS®, OS/2®, UNIX®, LINUX®, or another known operating system to handle input signals. The input component 610 may send aspects of these input signals to other components of the device 605 for processing. For example, the input component 610 may transmit input signals to the performance analysis manager 620 to support pattern detection for tenant-specific performance data. In some cases, the input component 610 may be a component of an input/output (I/O) controller 810, as described with reference to FIG. 8.

The output component 615 may manage output signals for the device 605. For example, the output component 615 may receive signals from other components of the device 605, such as the performance analysis manager 620, and may transmit these signals to other components or devices. In some examples, the output component 615 may transmit output signals for display in a user interface, for storage in a database or data store, for further processing at a server or server cluster, or for any other processes at any number of devices or systems. In some cases, the output component 615 may be a component of an I/O controller 810, as described with reference to FIG. 8.

For example, the performance analysis manager 620 may include a data log storing component 625, a user input receiving component 630, a query executing component 635, a result analyzing component 640, an entity displaying component 645, or any combination thereof. In some examples, the performance analysis manager 620, or various components thereof, may be configured to perform various operations (e.g., receiving, monitoring, transmitting) using or otherwise in cooperation with the input component 610, the output component 615, or both. For example, the performance analysis manager 620 may receive information from the input component 610, send information to the output component 615, or be integrated in combination with the input component 610, the output component 615, or both to receive information, transmit information, or perform various other operations, as described herein.

The performance analysis manager 620 may support data processing at a database system (the device 605) in accordance with examples disclosed herein. The data log storing component 625 may be configured as or otherwise support a means for storing one or more data logs that include performance data associated with multiple tenants of the database system. The user input receiving component 630 may be configured as or otherwise support a means for receiving, via a user interface of a user device, a user input indicating a request to perform an analysis of performance data associated with a tenant of the multiple tenants, where the user input is received from a user associated with the tenant, and where the request indicates a time period and a performance metric for the analysis. The query executing component 635 may be configured as or otherwise support a means for executing a query in response to the request, where the query is executed on a subset of the one or more data logs associated with the tenant and the performance metric. The result analyzing component 640 may be configured as or otherwise support a means for analyzing a result of the query to determine one or more entities that affected the performance metric during the time period. The entity displaying component 645 may be configured as or otherwise support a means for transmitting an indication of the one or more entities for display at the user interface of the user device.

Figure 7:
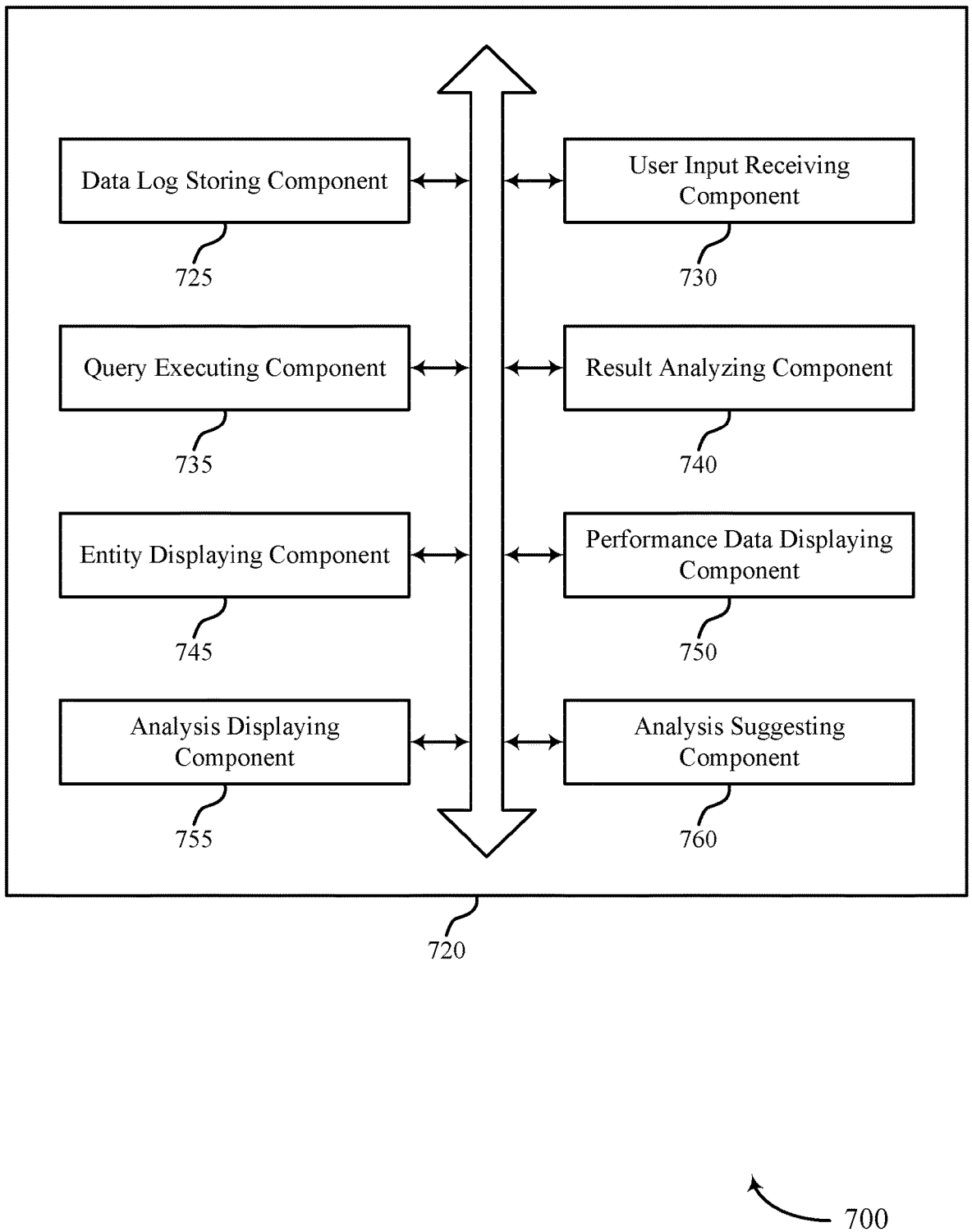
FIG. 7 shows a block diagram of a performance analysis manager that supports pattern detection for tenant-specific performance data in accordance with aspects of the present disclosure.

FIG. 7 shows a block diagram 700 of a performance analysis manager 720 that supports pattern detection for tenant-specific performance data in accordance with aspects of the present disclosure. The performance analysis manager 720 may be an example of aspects of a performance analysis manager or a performance analysis manager 620, or both, as described herein. The performance analysis manager 720, or various components thereof, may be an example of means for performing various aspects of pattern detection for tenant-specific performance data, as described herein. For example, the performance analysis manager 720 may include a data log storing component 725, a user input receiving component 730, a query executing component 735, a result analyzing component 740, an entity displaying component 745, a performance data displaying component 750, an analysis displaying component 755, an analysis suggesting component 760, or any combination thereof. Each of these components may communicate, directly or indirectly, with one another (e.g., via one or more buses).

The performance analysis manager 720 may support data processing at a database system in accordance with examples disclosed herein. The data log storing component 725 may be configured as or otherwise support a means for storing one or more data logs that include performance data associated with multiple tenants of the database system. The user input receiving component 730 may be configured as or otherwise support a means for receiving, via a user interface of a user device, a user input indicating a request to perform an analysis of performance data associated with a tenant of the multiple tenants, where the user input is received from a user associated with the tenant, and where the request indicates a time period and a performance metric for the analysis. The query executing component 735 may be configured as or otherwise support a means for executing a query in response to the request, where the query is executed on a subset of the one or more data logs associated with the tenant and the performance metric. The result analyzing component 740 may be configured as or otherwise support a means for analyzing a result of the query to determine one or more entities that affected the performance metric during the time period. The entity displaying component 745 may be configured as or otherwise support a means for transmitting an indication of the one or more entities for display at the user interface of the user device.

In some examples, to support executing the query, the query executing component 735 may be configured as or otherwise support a means for transmitting, to a service supported by the database system, instructions to execute the query on the subset of the one or more data logs, where the service is configured to execute queries for the tenant of the database system.

In some examples, the performance data displaying component 750 may be configured as or otherwise support a means for transmitting, for display at the user interface of the user device, a subset of the performance data associated with the tenant, where the request from the user is received after displaying the subset of the performance data at the user interface of the user device.

In some examples, the analysis suggesting component 760 may be configured as or otherwise support a means for transmitting, for display at the user interface of the user device, an indication of a suggested analysis for the subset of the performance data, where the request to perform the analysis is received in response to displaying the indication of the suggested analysis.

In some examples, the analysis displaying component 755 may be configured as or otherwise support a means for transmitting, for display at the user interface of the user device, an indication of a metric type associated with the performance metric, a timestamp associated with execution of the query, a start time of the analysis, an end time of the analysis, a completion status of the analysis, or a combination thereof.

In some examples, to support transmitting an indication of the one or more entities, the entity displaying component 745 may be configured as or otherwise support a means for transmitting an indication of one or more user identifiers, device identifiers, user actions, data objects, or data records that have affected the performance metric during the time period. In some examples, the performance metric may include a processing time, a quantity of processing resources, a quantity of memory resources, an error type, or a combination thereof.

Figure 8:
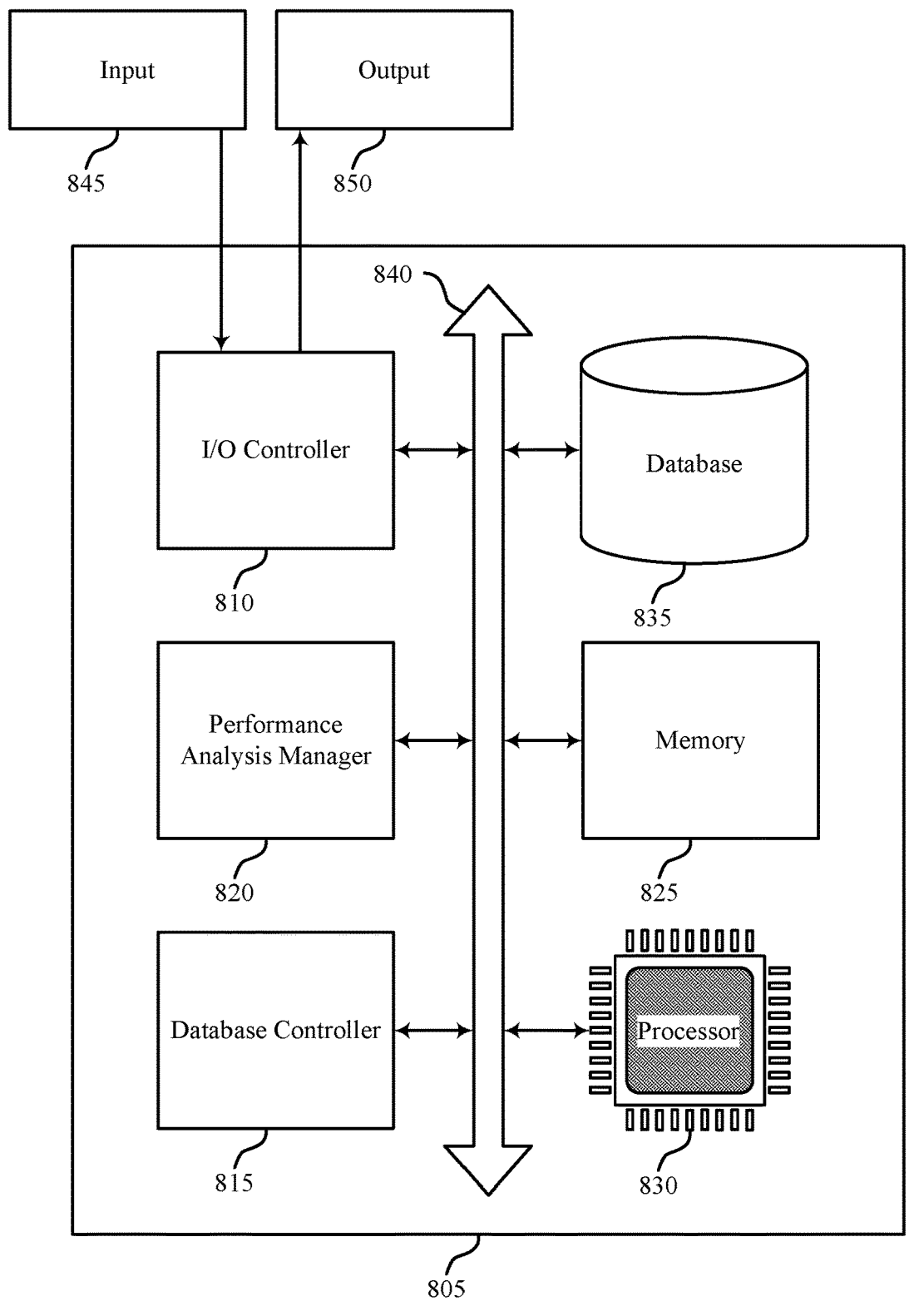
FIG. 8 shows a diagram of a system with a device that supports pattern detection for tenant-specific performance data in accordance with aspects of the present disclosure.

FIG. 8 shows a diagram of a system 800 including a device 805 that supports pattern detection for tenant-specific performance data in accordance with aspects of the present disclosure. The device 805 may be an example of or include the components of a device 605, as described herein. The device 805 may include components for data communications including components for transmitting and receiving communications, such as a performance analysis manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-PERIODS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor 830 to perform various functions described herein. In some cases, the memory 825 may include (among other things) a basic I/O system (BIOS) to control basic hardware or software operations, such as interactions with peripheral components or devices.

The processor 830 may include an intelligent hardware device, (e.g., a general-purpose processor, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting pattern detection for tenant-specific performance data).

The performance analysis manager 820 may support data processing at a database system (the device 805) in accordance with examples disclosed herein. For example, the performance analysis manager 820 may be configured as or otherwise support a means for storing one or more data logs that include performance data associated with multiple tenants of the database system. The performance analysis manager 820 may be configured as or otherwise support a means for receiving, via a user interface of a user device, a user input indicating a request to perform an analysis of performance data associated with a tenant of the multiple tenants, where the user input is received from a user associated with the tenant, and where the request indicates a time period and a performance metric for the analysis. The performance analysis manager 820 may be configured as or otherwise support a means for executing a query in response to the request, where the query is executed on a subset of the one or more data logs associated with the tenant and the performance metric. The performance analysis manager 820 may be configured as or otherwise support a means for analyzing a result of the query to determine one or more entities that affected the performance metric during the time period. The performance analysis manager 820 may be configured as or otherwise support a means for transmitting an indication of the one or more entities for display at the user interface of the user device.

By including or configuring the performance analysis manager 820 in accordance with examples, as described herein, the device 805 may provide visibility to server-side scale metrics and enable troubleshooting and resolution of scale issues in a self-service manner. Additionally, the device 805 may be capable of surfacing (e.g., displaying) underlying correlations between various scale issues or errors (e.g., a database row lock contention leading to a process concurrency issue). Furthermore, the device 805 may provide details related to which aspects of a tenant design architecture are most likely to experience scale or performance issues.

Figure 9:
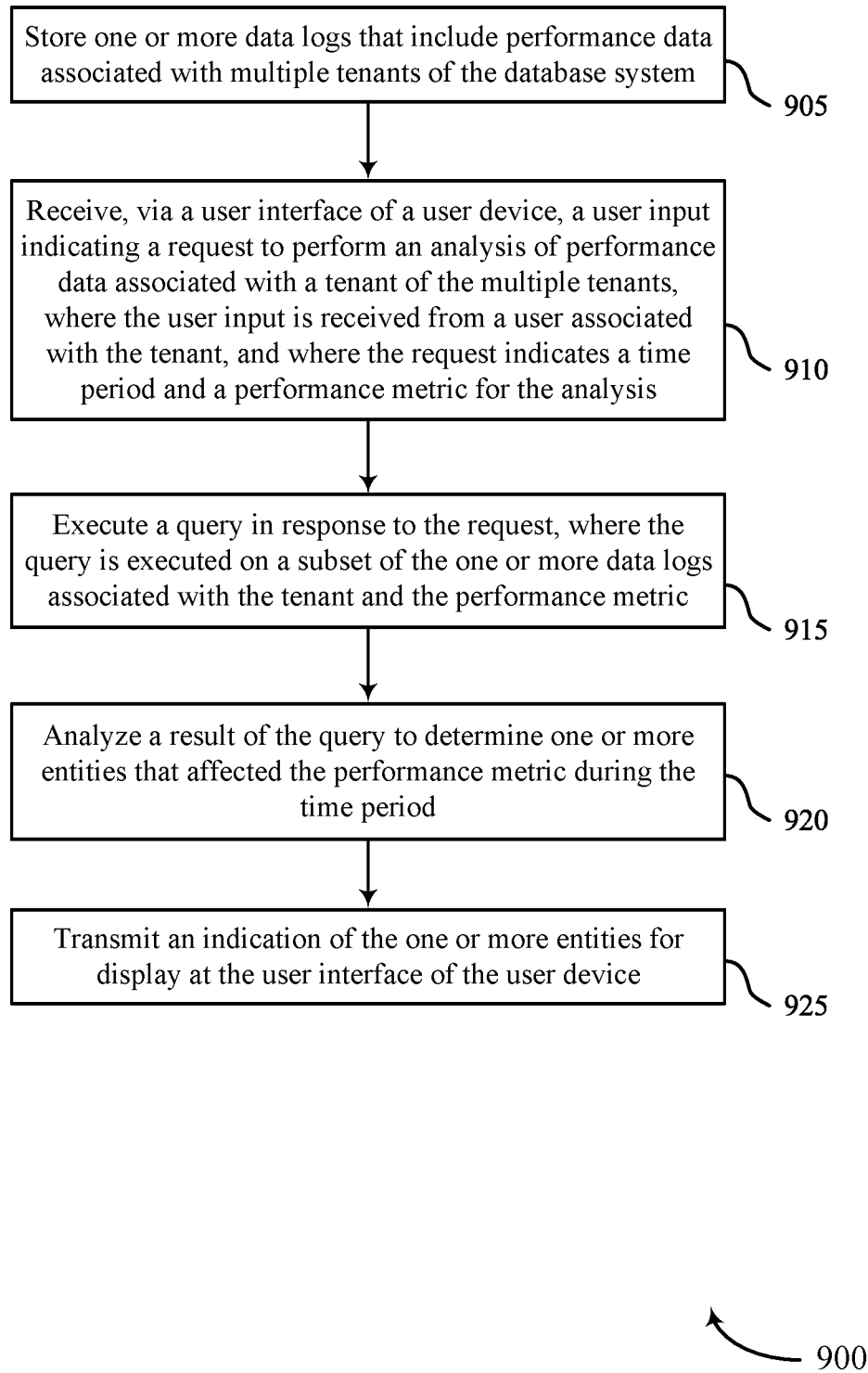
FIGS. 9 through 12 show flowcharts illustrating methods that support pattern detection for tenant-specific performance data in accordance with aspects of the present disclosure.

FIG. 9 shows a flowchart illustrating a method 900 that supports pattern detection for tenant-specific performance data in accordance with one or more aspects of the present disclosure. The operations of the method 900 may be implemented by a database system or components thereof. For example, the operations of the method 900 may be performed by a multi-tenant database system 205, as described with reference to FIG. 2. In some examples, a database system may execute a set of instructions to control the functional elements of the database system to perform the described functions. Additionally, or alternatively, the database system may perform aspects of the described functions using special-purpose hardware.

At 905, the database system may store one or more data logs that include performance data associated with multiple tenants of the database system. The operations of 905 may be performed in accordance with examples disclosed herein. In some examples, aspects of the operations of 905 may be performed by a data log storing component 725, as described with reference to FIG. 7.

At 910, the database system may receive, via a user interface of a user device, a user input indicating a request to perform an analysis of performance data associated with a tenant of the multiple tenants, where the user input is received from a user associated with the tenant, and where the request indicates a time period and a performance metric for the analysis. The operations of 910 may be performed in accordance with examples disclosed herein. In some examples, aspects of the operations of 910 may be performed by a user input receiving component 730, as described with reference to FIG. 7.

At 915, the database system may execute a query in response to the request, where the query is executed on a subset of the one or more data logs associated with the tenant and the performance metric. The operations of 915 may be performed in accordance with examples disclosed herein. In some examples, aspects of the operations of 915 may be performed by a query executing component 735, as described with reference to FIG. 7.

At 920, the database system may analyze a result of the query to determine one or more entities that affected the performance metric during the time period. The operations of 920 may be performed in accordance with examples disclosed herein. In some examples, aspects of the operations of 920 may be performed by a result analyzing component 740, as described with reference to FIG. 7.

At 925, the database system may transmit an indication of the one or more contributors for display at the user interface of the user device. The operations of 925 may be performed in accordance with examples disclosed herein. In some examples, aspects of the operations of 925 may be performed by an entity displaying component 745, as described with reference to FIG. 7.

Figure 10:
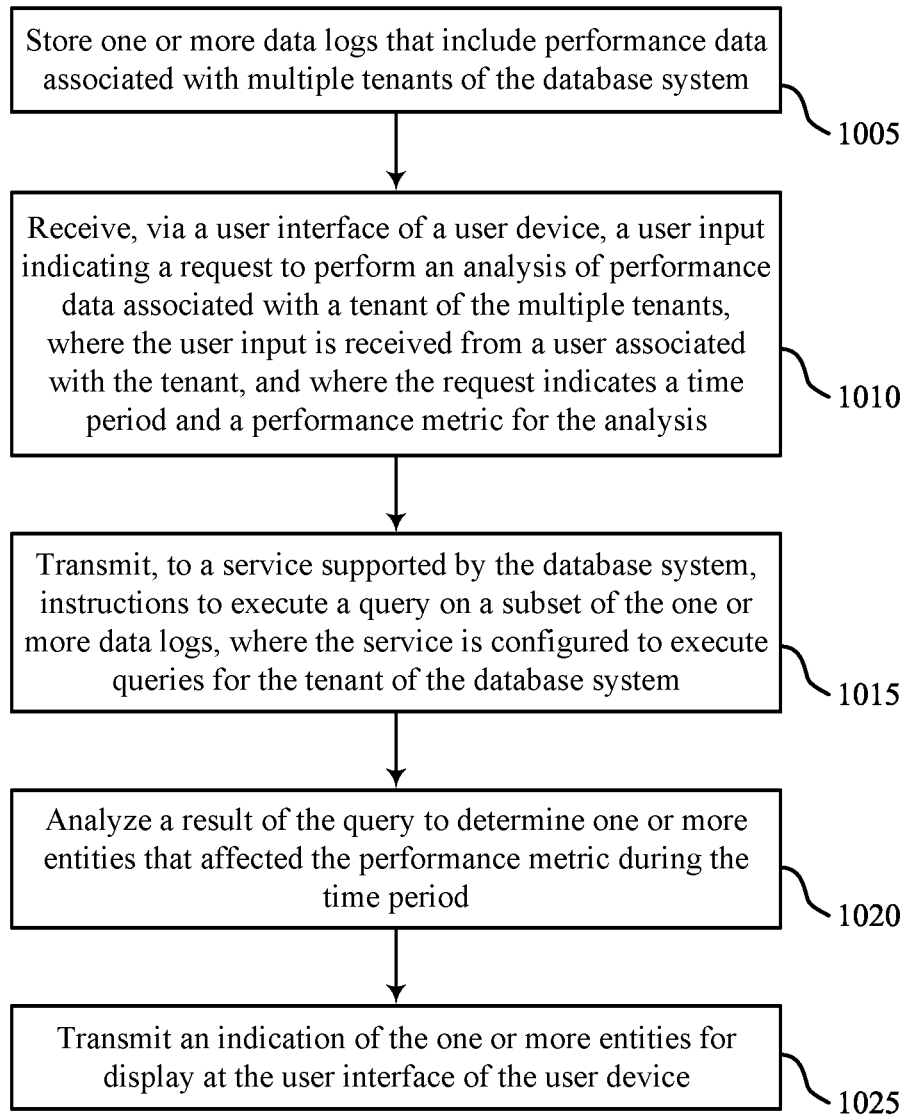

FIG. 10 shows a flowchart illustrating a method 1000 that supports pattern detection for tenant-specific performance data in accordance with aspects of the present disclosure. The operations of the method 1000 may be implemented by a database system or components thereof. For example, the operations of the method 1000 may be performed by a multi-tenant database system 505, as described with reference to FIG. 5. In some examples, a database system may execute a set of instructions to control the functional elements of the database system to perform the described functions. Additionally, or alternatively, the database system may perform aspects of the described functions using special-purpose hardware.

At 1005, the database system may store one or more data logs that include performance data associated with multiple tenants of the database system. The operations of 1005 may be performed in accordance with examples disclosed herein. In some examples, aspects of the operations of 1005 may be performed by a data log storing component 725, as described with reference to FIG. 7.

At 1010, the database system may receive, via a user interface of a user device, a user input indicating a request to perform an analysis of performance data associated with a tenant of the multiple tenants, where the user input is received from a user associated with the tenant, and where the request indicates a time period and a performance metric for the analysis. The operations of 1010 may be performed in accordance with examples disclosed herein. In some examples, aspects of the operations of 1010 may be performed by a user input receiving component 730, as described with reference to FIG. 7.

At 1015, the database system may transmit, to a service supported by the database system, instructions to execute a query on a subset of the one or more data logs, where the service is configured to execute queries for the tenant of the database system. The operations of 1015 may be performed in accordance with examples disclosed herein. In some examples, aspects of the operations of 1015 may be performed by a query executing component 735, as described with reference to FIG. 7.

At 1020, the database system may analyze a result of the query to determine one or more entities that affected the performance metric during the time period. The operations of 1020 may be performed in accordance with examples disclosed herein. In some examples, aspects of the operations of 1020 may be performed by a result analyzing component 740, as described with reference to FIG. 7.

At 1025, the database system may transmit an indication of the one or more entities for display at the user interface of the user device. The operations of 1025 may be performed in accordance with examples disclosed herein. In some examples, aspects of the operations of 1025 may be performed by an entity displaying component 745, as described with reference to FIG. 7.

Figure 11:
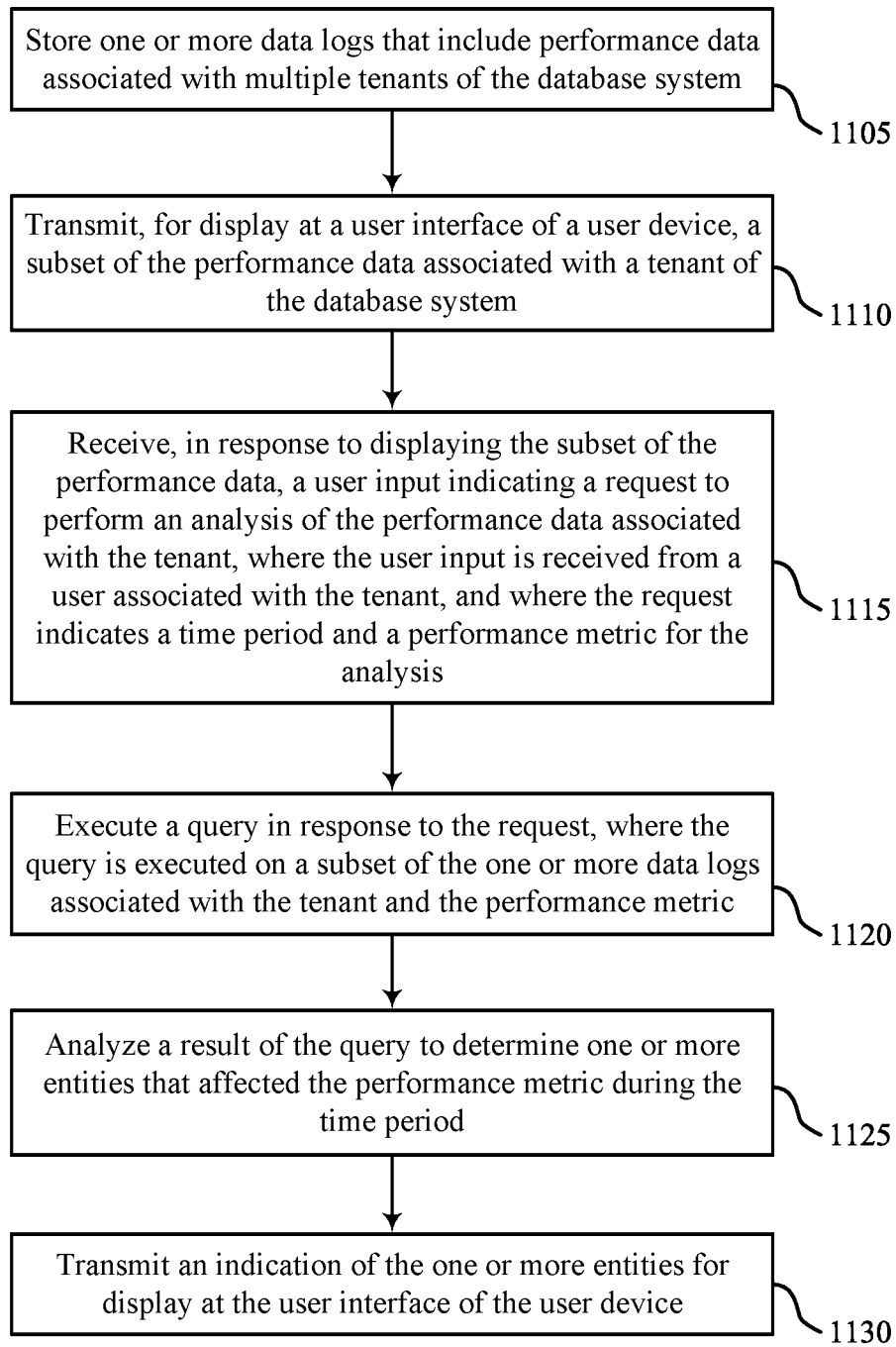

FIG. 11 shows a flowchart illustrating a method 1100 that supports pattern detection for tenant-specific performance data in accordance with aspects of the present disclosure. The operations of the method 1100 may be implemented by a database system or components thereof. For example, the operations of the method 1100 may be performed by a multi-tenant database system 205, as described with reference to FIG. 2. In some examples, a database system may execute a set of instructions to control the functional elements of the database system to perform the described functions. Additionally, or alternatively, the database system may perform aspects of the described functions using special-purpose hardware.

At 1105, the database system may store one or more data logs that include performance data associated with multiple tenants of the database system. The operations of 1105 may be performed in accordance with examples disclosed herein. In some examples, aspects of the operations of 1105 may be performed by a data log storing component 725, as described with reference to FIG. 7.

At 1110, the database system may transmit, for display at a user interface of a user device, a subset of the performance data associated with a tenant of the database system. The operations of 1110 may be performed in accordance with examples disclosed herein. In some examples, aspects of the operations of 1110 may be performed by a performance data displaying component 750, as described with reference to FIG. 7.

At 1115, the database system may receive, in response to displaying the subset of the performance data, a user input indicating a request to perform an analysis of the performance data associated with the tenant, where the user input is received from a user associated with the tenant, and where the request indicates a time period and a performance metric for the analysis. The operations of 1115 may be performed in accordance with examples disclosed herein. In some examples, aspects of the operations of 1115 may be performed by a user input receiving component 730, as described with reference to FIG. 7.

At 1120, the database system may execute a query in response to the request, where the query is executed on a subset of the one or more data logs associated with the tenant and the performance metric. The operations of 1120 may be performed in accordance with examples disclosed herein. In some examples, aspects of the operations of 1120 may be performed by a query executing component 735, as described with reference to FIG. 7.

At 1125, the database system may analyze a result of the query to determine one or more entities that affected the performance metric during the time period. The operations of 1125 may be performed in accordance with examples disclosed herein. In some examples, aspects of the operations of 1125 may be performed by a result analyzing component 740, as described with reference to FIG. 7.

At 1130, the database system may transmit an indication of the one or more entities for display at the user interface of the user device. The operations of 1130 may be performed in accordance with examples disclosed herein. In some examples, aspects of the operations of 1130 may be performed by an entity displaying component 745, as described with reference to FIG. 7.

Figure 12:
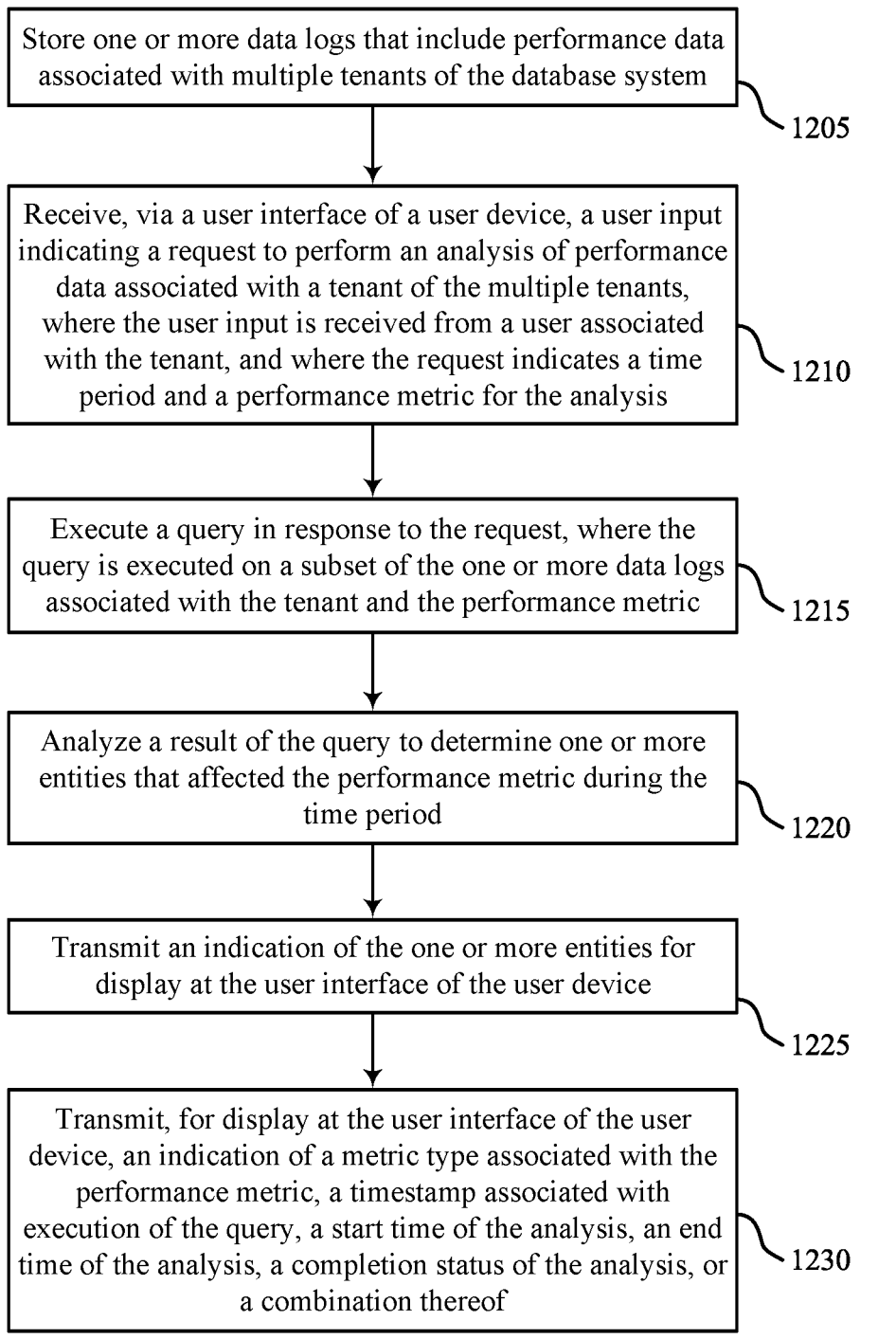

FIG. 12 shows a flowchart illustrating a method 1200 that supports pattern detection for tenant-specific performance data in accordance with aspects of the present disclosure. The operations of the method 1200 may be implemented by a database system or components thereof. For example, the operations of the method 1200 may be performed by a multi-tenant database system 505, as described with reference to FIG. 5. In some examples, a database system may execute a set of instructions to control the functional elements of the database system to perform the described functions. Additionally, or alternatively, the database system may perform aspects of the described functions using special-purpose hardware.

At 1205, database system may store one or more data logs that include performance data associated with multiple tenants of the database system. The operations of 1205 may be performed in accordance with examples disclosed herein. In some examples, aspects of the operations of 1205 may be performed by a data log storing component 725, as described with reference to FIG. 7.

At 1210, the database system may receive, via a user interface of a user device, a user input indicating a request to perform an analysis of performance data associated with a tenant of the multiple tenants, where the user input is received from a user associated with the tenant, and where the request indicates a time period and a performance metric for the analysis. The operations of 1210 may be performed in accordance with examples disclosed herein. In some examples, aspects of the operations of 1210 may be performed by a user input receiving component 730, as described with reference to FIG. 7.

At 1215, the database system may execute a query in response to the request, where the query is executed on a subset of the one or more data logs associated with the tenant and the performance metric. The operations of 1215 may be performed in accordance with examples disclosed herein. In some examples, aspects of the operations of 1215 may be performed by a query executing component 735, as described with reference to FIG. 7.

At 1220, the database system may analyze a result of the query to determine one or more entities that affected the performance metric during the time period. The operations of 1220 may be performed in accordance with examples disclosed herein. In some examples, aspects of the operations of 1220 may be performed by a result analyzing component 740, as described with reference to FIG. 7.

At 1225, the database system may transmit an indication of the one or more entities for display at the user interface of the user device. The operations of 1225 may be performed in accordance with examples disclosed herein. In some examples, aspects of the operations of 1225 may be performed by an entity displaying component 745, as described with reference to FIG. 7.

At 1230, the database system may transmit, for display at the user interface of the user device, an indication of a metric type associated with the performance metric, a timestamp associated with execution of the query, a start time of the analysis, an end time of the analysis, a completion status of the analysis, or a combination thereof. The operations of 1230 may be performed in accordance with examples disclosed herein. In some examples, aspects of the operations of 1230 may be performed by an analysis displaying component 755, as described with reference to FIG. 7.

A method for data processing at a database system is described. The method may include storing one or more data logs that include performance data associated with multiple tenants of the database system. The method may further include receiving, via a user interface of a user device, a user input indicating a request to perform an analysis of performance data associated with a tenant of the multiple tenants, where the user input is received from a user associated with the tenant, and where the request indicates a time period and a performance metric for the analysis. The method may further include executing a query in response to the request, where the query is executed on a subset of the one or more data logs associated with the tenant and the performance metric. The method may further include analyzing a result of the query to determine one or more entities that affected the performance metric during the time period. The method may further include transmitting an indication of the one or more entities for display at the user interface of the user device.

An apparatus for data processing at a database system is described. The apparatus may include a processor, memory coupled with the processor, and instructions stored in the memory. The instructions may be executable by the processor to cause the apparatus to store one or more data logs that include performance data associated with multiple tenants of the database system. The instructions may be further executable by the processor to cause the apparatus to receive, via a user interface of a user device, a user input indicating a request to perform an analysis of performance data associated with a tenant of the multiple tenants, where the user input is received from a user associated with the tenant, and where the request indicates a time period and a performance metric for the analysis. The instructions may be further executable by the processor to cause the apparatus to execute a query in response to the request, where the query is executed on a subset of the one or more data logs associated with the tenant and the performance metric. The instructions may be further executable by the processor to cause the apparatus to analyze a result of the query to determine one or more entities that affected the performance metric during the time period. The instructions may be further executable by the processor to cause the apparatus to transmit an indication of the one or more entities for display at the user interface of the user device.

Another apparatus for data processing at a database system is described. The apparatus may include means for storing one or more data logs that include performance data associated with multiple tenants of the database system. The apparatus may further include means for receiving, via a user interface of a user device, a user input indicating a request to perform an analysis of performance data associated with a tenant of the multiple tenants, where the user input is received from a user associated with the tenant, and where the request indicates a time period and a performance metric for the analysis. The apparatus may further include means for executing a query in response to the request, where the query is executed on a subset of the one or more data logs associated with the tenant and the performance metric. The apparatus may further include means for analyzing a result of the query to determine one or more entities that affected the performance metric during the time period. The apparatus may further include means for transmitting an indication of the one or more entities for display at the user interface of the user device.

A non-transitory computer-readable medium storing code for data processing at a database system is described. The code may include instructions that are executable by a processor to store one or more data logs that include performance data associated with multiple tenants of the database system. The instructions may be further executable by the processor to receive, via a user interface of a user device, a user input indicating a request to perform an analysis of performance data associated with a tenant of the multiple tenants, where the user input is received from a user associated with the tenant, and where the request indicates a time period and a performance metric for the analysis. The instructions may be further executable by the processor to execute a query in response to the request, where the query is executed on a subset of the one or more data logs associated with the tenant and the performance metric. The instructions may be further executable by the processor to analyze a result of the query to determine one or more entities that affected the performance metric during the time period. The instructions may be further executable by the processor to transmit an indication of the one or more entities for display at the user interface of the user device.

In some examples of the methods, apparatuses, and non-transitory computer-readable media described herein, executing the query may include operations, features, means, or instructions for transmitting, to a service supported by the database system, instructions to execute the query on the subset of the one or more data logs, where the service is configured to execute queries for the tenant of the database system.

Some examples of the methods, apparatuses, and non-transitory computer-readable media described herein may further include operations, features, means, or instructions for transmitting, for display at the user interface of the user device, a subset of the performance data associated with the tenant, where the request from the user is received after displaying the subset of the performance data at the user interface of the user device.

Some examples of the methods, apparatuses, and non-transitory computer-readable media described herein may further include operations, features, means, or instructions for transmitting, for display at the user interface of the user device, an indication of a suggested analysis for the subset of the performance data, where the request to perform the analysis is received in response to the indication of the suggested analysis.

Some examples of the methods, apparatuses, and non-transitory computer-readable media described herein may further include operations, features, means, or instructions for transmitting, for display at the user interface of the user device, an indication of a metric type associated with the performance metric, a timestamp associated with execution of the query, a start time of the analysis, an end time of the analysis, a completion status of the analysis, or a combination thereof.

In some examples of the methods, apparatuses, and non-transitory computer-readable media described herein, transmitting the indication of the one or more entities may include operations, features, means, or instructions for transmitting an indication of one or more user identifiers, device identifiers, user actions, data objects, or data records that have affected the performance metric during the time period.

In some examples of the methods, apparatuses, and non-transitory computer-readable media described herein, the performance metric includes a processing time, a quantity of processing resources, a quantity of memory resources, an error type, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   storing, within a database system, one or more data logs that include performance data associated with a plurality of tenants of the database system;
   receiving, via a user interface of a user device, a user input indicating a request to perform an analysis of performance data associated with a tenant of the plurality of tenants, wherein the request indicates a time period and a performance metric for the analysis;
   executing, by the database system, a query in response to the request, wherein the query is executed on a subset of the one or more data logs associated with the tenant and the performance metric;
   analyzing, by the database system, a result of the query to determine one or more entities that affected the performance metric during the time period; and
   transmitting, by the database system, an indication of the analysis for display on the user interface of the user device, the analysis comprising a tenant-specific visualization of changes to the performance metric during the time period, identifiers of the one or more entities affecting the performance metric during the time period, and a suggested action to remediate or improve the performance of the database system based on the performance metric.

2. The method of claim 1, wherein executing the query comprises:
   transmitting, to a service supported by the database system, instructions to execute the query on the subset of the one or more data logs, wherein the service is configured to execute queries for the tenant of the database system.

3. The method of claim 1, further comprising:
   transmitting, for display at the user interface of the user device, a subset of the performance data associated with the tenant, wherein the request to perform the analysis is received after displaying the subset of the performance data at the user interface of the user device.

4. The method of claim 3, further comprising:
   transmitting, for display at the user interface of the user device, an indication of a suggested analysis for the subset of the performance data, wherein the request to perform the analysis is received in response to displaying the indication of the suggested analysis.

5. The method of claim 1, further comprising:
   transmitting, for display at the user interface of the user device, an indication of a metric type associated with the performance metric, a timestamp associated with execution of the query, a start time of the analysis, an end time of the analysis, a completion status of the analysis, or a combination thereof.

6. The method of claim 1, wherein transmitting the indication of the one or more entities comprises:

transmitting, for display at the user interface of the user device, an indication of one or more user identifiers, device identifiers, user actions, data objects, or data records that have affected the performance metric during the time period.

7. The method of claim 1, wherein the performance metric comprises a processing time, a quantity of processing resources, a quantity of memory resources, an error type, or a combination thereof.

8. An apparatus for data processing, comprising:
at least one processor;
at least one memory coupled with the at least one processor; and
instructions stored in the at least one memory and executable by the at least one processor to cause the apparatus to:
store, within a database system, one or more data logs that include performance data associated with a plurality of tenants of the database system;
receive, via a user interface of a user device, a user input indicating a request to perform an analysis of performance data associated with a tenant of the plurality of tenants, wherein the request indicates a time period and a performance metric for the analysis;
execute, by the database system, a query in response to the request, wherein the query is executed on a subset of the one or more data logs associated with the tenant and the performance metric;
analyze, by the database system, a result of the query to determine one or more entities that affected the performance metric during the time period; and
transmit, by the database system, an indication of the analysis for display on the user interface of the user device, the analysis comprising a tenant-specific visualization of changes to the performance metric during the time period, identifiers of the one or more entities affecting the performance metric during the time period, and a suggested action to remediate or improve the performance of the database system based on the performance metric.

9. The apparatus of claim 8, wherein to execute the query, the instructions are executable by the at least one processor to cause the apparatus to:
transmit, to a service supported by the database system, instructions to execute the query on the subset of the one or more data logs, wherein the service is configured to execute queries for the tenant of the database system.

10. The apparatus of claim 8, wherein the instructions are further executable by the at least one processor to cause the apparatus to:
transmit, for display at the user interface of the user device, a subset of the performance data associated with the tenant, wherein the request to perform the analysis is received after displaying the subset of the performance data at the user interface of the user device.

11. The apparatus of claim 10, wherein the instructions are further executable by the at least one processor to cause the apparatus to:
transmit, for display at the user interface of the user device, an indication of a suggested analysis for the subset of the performance data, wherein the request to perform the analysis is received in response to displaying the indication of the suggested analysis.

12. The apparatus of claim 8, wherein the instructions are further executable by the at least one processor to cause the apparatus to:
transmit, for display at the user interface of the user device, an indication of a metric type associated with the performance metric, a timestamp associated with execution of the query, a start time of the analysis, an end time of the analysis, a completion status of the analysis, or a combination thereof.

13. The apparatus of claim 8, wherein to transmit the indication of the one or more entities, the instructions are executable by the at least one processor to cause the apparatus to:
transmit, for display at the user interface of the user device, an indication of one or more user identifiers, device identifiers, user actions, data objects, or data records that have affected the performance metric during the time period.

14. The apparatus of claim 8, wherein the performance metric comprises a processing time, a quantity of processing resources, a quantity of memory resources, an error type, or a combination thereof.

15. A non-transitory computer-readable medium storing code for data processing, the code comprising instructions executable by at least one processor to:
store, within a database system, one or more data logs that include performance data associated with a plurality of tenants of the database system;
receive, via a user interface of a user device, a user input indicating a request to perform an analysis of performance data associated with a tenant of the plurality of tenants, wherein the request indicates a time period and a performance metric for the analysis;
execute, by the database system, a query in response to the request, wherein the query is executed on a subset of the one or more data logs associated with the tenant and the performance metric;
analyze, by the database system, a result of the query to determine one or more entities that affected the performance metric during the time period; and
transmit, by the database system, an indication of the analysis for display on the user interface of the user device, the analysis comprising a tenant-specific visualization of changes to the performance metric during the time period, identifiers of the entities affecting the performance metric during the time period, and a suggested action to remediate or improve the performance of the database system based on the performance metric.

16. The non-transitory computer-readable medium of claim 15, wherein, to execute the query, the instructions are executable by the at least one processor to:
transmit, to a service supported by the database system, instructions to execute the query on the subset of the data logs, wherein the service is configured to execute queries for the tenant of the database system.

17. The non-transitory computer-readable medium of claim 15, wherein the instructions are further executable by the at least one processor to:
transmit, for display at the user interface of the user device, a subset of the performance data associated with the tenant, wherein the request to perform the analysis is received after displaying the subset of the performance data at the user interface of the user device.

18. The non-transitory computer-readable medium of claim 17, wherein the instructions are further executable by the at least one processor to:
- transmit, for display at the user interface of the user device, an indication of a suggested analysis for the subset of the performance data, wherein the request to perform the analysis is received in response to displaying the indication of the suggested analysis.

19. The non-transitory computer-readable medium of claim 15, wherein the instructions are further executable by the at least one processor to:
- transmit, for display at the user interface of the user device, an indication of a metric type associated with the performance metric, a timestamp associated with execution of the query, a start time of the analysis, an end time of the analysis, a completion status of the analysis, or a combination thereof.

20. The non-transitory computer-readable medium of claim 15, wherein to transmit the indication of the one or more entities, the instructions are executable by the at least one processor to:
- transmit, for display at the user interface of the user device, an indication of one or more user identifiers, device identifiers, user actions, data objects, or data records that have affected the performance metric during the time period.

* * * * *